3,647,917
ROOM TEMPERATURE VULCANIZABLE SILICONE RUBBER WITH UNPRIMED ADHESION
Jay R. Schulz, Bay City, and William H. Clark, Mount Pleasant, Mich., assignors to Dow Corning Corporation, Midland, Mich.
No Drawing. Filed Apr. 6, 1970, Ser. No. 26,067
Int. Cl. C08g 47/06
U.S. Cl. 260—825       35 Claims

ABSTRACT OF THE DISCLOSURE

A mixture of a polydiorganosiloxane having hydroxy, acetoxy or alkoxy functionality and a mixture containing at least 10 weight percent of an alkoxyacetoxysiloxane plus alkoxy and acetoxy silanes vulcanizes at room temperature to provide a silicone rubber with improved unprimed adhesion to substrates such as metals.

---

This invention relates to a room temperature vulcanizable silicone rubber.

Room temperature vulcanizable silicone rubbers curable through a number of widely varying mechanisms are known in the art. Some of the room temperature vulcanizable silicone rubbers cure by exposure to atmospheric moisture and through hydrolyzable functionality. The room temperature vulcanizable silicone rubbers of this invention are of this type. Such hydrolyzable functionality includes silicon-bonded acetoxy and alkoxy groups. The room temperature vulcanizable silicone rubbers known in the art have widely varying adhesion to substrates such as metals, glass, ceramics, wood and organic plastics. Many of these silicone rubbers have been made to adhere to the substrates by using primers but this approach is a time consuming multi-step process. Another and certainly an improved approach would be to provide a room temperature vulcanizable silicone rubber which adheres to the substrates without primers. Room temperature vulcanizable silicone rubbers with improved adhesion have been described in U.S. Pats. Nos. 3,296,161 and 3,296,195. These patents describe the use of silanes having both acyloxy and alkoxy functionality as additives to improve the adhesion to substrates such as stainless steel and aluminum. The room temperature vulcanizable silicone rubbers described in these patents improve the adhesion over the room temperature vulcanizable silicone rubber without the use of such an additive. This improved adhesion may be satisfactory in certain applications, however, a greater adhesion to substrates such as aluminum, stainless steel and titanium is desired in today's rapidly advancing aerospace industry. It is an object of the present invention to provide room temperature vulcanizable silicone rubber with a further improved unprimed adhesion to metal substrates. It is also an object of the present invention to provide a cross-linking agent useful in preparing room temperature vulcanizable silicone rubber with improved unprimed adhesion to metals.

This invention relates to a composition which is stable in the absence of moisture but cures to a silicone rubber when exposed to moisture at room temperature comprising (A) 100 parts by weight of a polydiorganosiloxane having a unit formula $R_2SiO$ bonded together by silicon-oxygen-silicon bonds and having a viscosity of from 1,000 to 200,000 cs. at 25° C., said polydiorganosiloxane being terminated by radicals selected from the group consisting of hydroxyl radicals and radicals of the formula $R(YO)_2SiO_{0.5}$ where R is a monovalent radical of from 1 to 18 inclusive carbon atoms selected from the group consisting of hydrocarbon radicals and halogenated hydrocarbon radicals and YO— is acetoxy or alkoxy, and (B) from 0.5 to 15 parts by weight of a cross-linking agent selected from the group consisting of (a) a mixture consisting essentially of at least 10 weight percent of an alkoxyacetoxysiloxane of the average unit formula

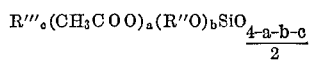

in which the ratio of $a:b$ is 0.85 to 1.75 inclusive, the sum of $a+b+c$ is from 2.4 to 3 inclusive, $c$ has an average value from 0 to 1 inclusive, $R'''$ is the same as R, $R''$ is a monovalent radical of from 1 to 6 inclusive carbon atoms selected from the group consisting of alkyl, alkoxyalkyl and phenyl and the remaining portion of the mixture consisting essentially of silanes, providing a silane mixture, of the formula

in which $R'''$ and $R''$ are defined above, for each silane specie $d$ is an integer of 0 to 1 inclusive, $e$ is an integer of 1 to 3 inclusive, $f$ is an integer of 1 to 3 inclusive, the sum of $d+e+f$ is 4, in the total remaining portion of the mixture, the silane mixture is such that in an average formula of silane the ratio of $e:f$ is 0.85 to 1.75 inclusive and $d$ has an average value from 0 to 1 inclusive, and (b) a mixture of (a) with a silane of the formula $R_gSi(OY)_{4-g}$ in which R and OY are defined above and $g$ is an integer of 0 to 1 inclusive and partial hydrolyzates of $R_gSi(OY)_{4-g}$ wherein (a) is present in an amount sufficient to provide at least 0.5 part by weight in the total mixture of (A) and (B).

The polydiorganosiloxane, (A), is composed of primarily $R_2SiO$ units which are bonded together by silicon-oxygen-silicon bonds to form the siloxane chains. Although primarily composed of $R_2SiO$ units, small amounts of $RSiO_{1.5}$ and $R_3SiO_{0.5}$ units can be present without departing from the scope of the present invention. Such small amounts are often present as production impurities and in some cases up to 5 or 10 mol percent of such units are present.

R is a monovalent radical of 1 to 18 inclusive carbon atoms, a hydrocarbon radical or a halogenated hydrocarbon radical. Examples of monovalent hydrocarbon radicals are methyl, ethyl, propyl, isopropyl, butyl, pentyl, hexyl, decyl, octadecyl, phenyl, tolyl, propargyl, xenyl, naphthyl, beta-phenylethyl, benzyl, cyclohexyl, vinyl, allyl and cyclohexenyl. Examples of monovalent halogenated hydrocarbon radicals are chloromethyl, 3-chloropropyl, bromoctadecyl, 3,3,3-trichloropropyl, chloroisopropyl, 2-(trifluoromethyl)ethyl, 2-(perfluoroethyl)ethyl, 2-(perfluorohexadecyl)ethyl, bromocyclohexyl, chlorocyclopentyl, fluorocyclohexyl, 2,4 - dichlorophenyl, dibromoxenyl, alpha,alpha,alpha-triflurotolyl, iodonaphthyl, tetrachlorophenyl, and 2-(bromophenyl)propyl.

The polydiorganosiloxanes of the present invention can be terminated with hydroxyl radicals to provide hydroxyl endblocked polydiorganosiloxanes or by $R(YO)_2SiO_{0.5}$ units to provide acetoxy endblocked polydiorganosiloxanes, or alkoxy endblocked polydiorganosiloxane depending on whether YO is acetoxy or alkoxy. The viscosity of the polydiorganosiloxane can be from 1,000 to 200,000 cs. at 25° C., preferably from 1,500 to 30,000 cs. at 25° C. The polydiorganosiloxanes are well known in the art as illustrated by the following U.S. patents which are incorporated herein by reference. Bruner in U.S. Pat. No. 3,035,016 describes polydiorganosiloxanes terminated by monoorganodiacetoxysiloxy units. U.S. Pat. No. 3,035,016 is hereby incorporated by reference in teaching the acetoxy endblocked polydiorganosiloxanes and the method of preparation which comprises heating the appropriate mixture of hydroxyl endblocked polydiorganosiloxane and organotriacetoxysilane. Russell in U.S. Pat. No. 3,061,575 teaches both acetoxy and hydroxyl endblocked polydiorganosiloxanes. U.S. Pat. No. 3,061,575 is hereby incorporated by reference in teaching acetoxy and hydroxyl endblocked polydiorganosiloxanes. Ceyzeriat in U.S. Pat. No. 3,133,891 teaches hydroxyl endblocked polydiorganosiloxanes which is hereby incorporated by reference. Dupree in U.S. Pat. No. 3,274,145 teaches hydroxyl endblocked polydiorganosiloxanes in which hydroxyl radicals are partially replaced by triorganosiloxane radicals. U.S. Pat. No. 3,274,145 is hereby incorporated by reference in teaching these hydroxyl endblocked polydiorganosiloxanes. Brown and Hyde in U.S. Pat. No. 3,161,614 teach polydiorganosiloxanes having monoorganodialkoxysiloxy endblocking units which is hereby incorporated by reference.

The mixture (a) contains at least 10 weight percent of an alkoxyacetoxysiloxane, preferably at least 25 weight percent of the alkoxyacetoxysiloxane. The percent alkoxyacetoxysiloxane is based on the total weight of mixture (a). The alkoxyacetoxysiloxane of mixture (a) has an average unit formula

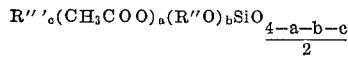

where the ratio of $a:b$ is 0.85 to 1.75 inclusive, the sum of $a+b+c$ is from 2.4 to 3 inclusive and $c$ has an average value of from 0 to 1 inclusive. The alkoxyacetoxy-siloxanes can have an average of from 2 to 5 silicon atoms per molecule and preferably from 2 to 3 silicon atoms per molecule The preferred ratio of $a:b$ is from 1.0 to 1.50 inclusive. Preferably $c$ is from 0.5 to 0.8 inclusive and the sum of $a+b+c$ is preferably from 2.6 to 3 inclusive. $R'''$ can be any of the monovalent hydrocarbon or halogenated hydrocarbon radicals defined above for R, preferably $R'''$ is methyl, ethyl, vinyl or phenyl. The $R'''$ on any two or more silicon atoms can be the same or different, thus $R'''$ in any one alkoxyacetoxysiloxane can represent two or more radicals, for example $R'''$ in an alkoxyacetoxysiloxane can be a mixture of methyl and ethyl radicals. $R''$ can be a monovalent radical of from 1 to 6 inclusive carbon atoms selected from alkyl, alkoxyalkyl and phenyl. The alkyl radicals can be, for example, methyl, ethyl, n-propyl, isopropyl, isobutyl, n-butyl, pentyl, hexyl, isopentyl, isohexyl and 3,3-dimethylbutyl. The alkoxyalkyl radicals can be, for example, methoxymethyl, 2-methoxyethyl, 2-ethoxyethyl, 2-ethoxypropyl, 3-ethoxypropyl, 3-propoxypropyl and 2-butoxyethyl.

The remaining portion of the mixture of (a) is a silane mixture having silanes of the formula

in which $R'''$ and $R''$ are defined above and $d$ is an integer of from 0 to 1 inclusive, $e$ is an integer of 1 to 3 inclusive, $f$ is an integer of 1 to 3 inclusive and the sum of $d+e+f$ is 4. In the total remaining portion of the mixture (a), the silane mixture is such that in an average formula of silane the ratio of $e:f$ is 0.85 to 1.75 inclusive and $d$ has an average value from 0 to 1 inclusive. Preferably, the ratio of $e:f$ in the silane mixture is from 1.00 to 1.50 inclusive and $d$ has an average value from 0.5 to 0.8 inclusive.

The mixture (a) of at least 10 weight percent alkoxyacetoxysiloxane and the silane mixture can be prepared by heating a mixture of alkoxysilanes and acetoxysilanes under anhydrous conditions by splitting out alkylacetates, alkoxyalkylacetates or phenylacetates depending upon the starting silanes. The silanes used in preparing the alkoxyacetoxysiloxane containing mixture (a) are used in amounts to provide the particular ratio of alkoxy to acetoxy desired in the final alkoxyacetoxysiloxane mixture of (a). Thus, if the ratio of $a:b$ is desired to be 1.5 and the starting monomers are methyltriacetoxysilane and tetraethoxysilane, the molar quantities of the silanes to provide the 1.5 ratio would be two moles of methyl triacetoxysilane to one mole of tetraethoxysilane. The alkoxysilane and the acetoxysilane are mixed under anhydrous conditions and then heated to 100° to 200° C. for periods of from one hour to 100 hours or more. The amount of alkoxyacetoxysiloxane in the mixture can readily be determined by a gas liquid chromatographic analysis. Shorter heating periods can be used by using a catalyst such as ferric chloride in amounts of from 0.0125 to 0.5 weight percent based on the weight of the starting silanes. The heating times can be reduced to 30 minutes to 5 hours. For example, where 30 to 40 weight percent alkoxyacetoxysiloxane is desired, the heating time without the catalyst can be as long as 60 to 100 hours at 150° C. whereas by using the ferric chloride catalyst the same product is obtained in less than 3 hours at 150° C. Other catalysts can also be used such as Filtrol acid clay and Amberlyst resin. The mixture (a) containing the alkoxyacetoxysiloxane can be prepared by other methods, such as by heating a mixture of an alkoxysilane, acetic anhydride and Filtrol acid clay. The heating temperature would be from about 100° to 125° C. for periods from 1 to 10 hours. In those cases where catalysts are used the final product is preferably filtered to remove the catalyst before it is used.

The starting acetoxysilanes can be, for example, methyltriacetoxysilane,
tetraacetoxysilane,
ethyltriacetoxysilane,
vinyltriacetoxysilane,
phenyltriacetoxysilane,
octadecyltriacetoxysilane,
n-hexyltriacetoxysilane,
cyclohexyltriacetoxysilane,
allyltriacetoxysilane,
isopropyltriacetoxysilane,
xenyltriacetoxysilane,
chloromethyltriacetoxysilane,
3,3,3-trifluoropropyltriacetoxysilane,
tolyltriacetoxysilane,
xylytriacetoxysilane,
benzyltriacetoxysilane,
decyltriacetoxysilane,
naphthyltriacetoxysilane,
bromooctadecyltriacetoxysilane,
chlorocyclopentyltriacetoxysilane,
2,4-dichlorophenyltriacetoxysilane,
iodonaphthyltriacetoxysilane and
dibromoxenyltriacetoxysilane. Mixtures of acetoxysilanes can be used, such as a mixture of ethyltriacetoxysilane and methyltriacetoxysilane wherein the ethyltriacetoxysilane is present in amount to provide at least 40 mol percent of the total mixture.

The starting alkoxysilanes can be, for example, tetraethoxysilane,
methyltriethoxysilane,
tetra-(2-methoxyethyl)silane,
tetra-normal-propoxysilane,
methyltrimethoxysilane,
ethyltriethoxysilane,
vinyltrimethoxysilane,
methyltrihexoxysilane,
tetra-normalbutoxysilane,
phenyltrimethoxysilane,
phenyltriethoxysilane,
tetraamyloxysilane,
butyltriamyloxysilane,
octadecyltrimethoxysilane,
octadecyltriisopropoxysilane,
n-hexyltriethoxysilane,
n-hexyltrimethoxysilane,
cyclohexyltributoxysilane,
allyltrihexoxysilane, isopropyltrimethoxysilane,
xenyltriethoxysilane,
chloromethyltributoxysilane,
3,3,3-trifluoropropyltrimethoxysilane,
dibromoxenyltriamyloxysilane,
chlorocyclopentyltripropoxysilane,
bromooctadecyltrimethoxysilane,
naphthyltriethoxysilane,
benzyltrihexoxysilane,
xylyltrimethoxysilane,
methyltriphenoxysilane,
ethyltriphenoxysilane,
tetraphenoxysilane,
octadecyltriphenoxysilane,
iodonaphthyltriphenoxysilane,
tetra-(2-ethoxyethoxy)silane,
methyltri-(2-ethoxyethoxy)silane,
tetra-(2-ethoxypropoxy)silane,
butyltri(2-butoxyethoxy)silane,
octadecyltri(methoxymethoxy)silane and
tetra(3-propoxypropoxy)silane.

The acetoxysilanes and alkoxysilanes are well known in the art and many can be purchased commercially.

The cross-linking agent can also be (b), a mixture of (a), as defined above, with a silane of the formula $R_gSi(OY)_{4-g}$ where R and OY are defined above and $g$ is an integer of from 0 to 1 inclusive and partial hydrolyzates of $R_gSi(OY)_{4-g}$. The silanes of the formula $R_gSi(OY)_{4-g}$ and the partial hydrolyzates thereof are well known in the art. Illustrative examples of $R_gSi(OY)_{4-g}$ where OY is acetoxy and alkoxy are shown above.

The amount of (a) present is sufficient to provide at least 0.5 parts by weight based on the total weight of (A) and (B). At least 0.5 parts by weight of (a) is present either as composition (a) alone or a mixture of (a) with a silane of the formula $R_gSi(OY)_{4-g}$ or the partial hydrolyzate thereof. The amount of (a) can be present to provide from 0.5 to 15 parts by weight based on the total weight of (A) and (B). When a mixture of (a) and the silane of the formula $R_gSi(OY)_{4-g}$ or the partial hydrolyzate thereof is used, the total amount of cross-linker should not exceed 15 parts by weight based on the total weight of (A) and (B). The amount of cross-linker can be from 0.5 to 15 parts by weight based on 100 parts by weight of (A). Preferably, the amount of cross-linker is from 5 to 15 parts by weight based on 100 parts by weight of (A). When the polydiorganosiloxane (A) is acetoxy or alkoxy endblocked, the amount of cross-linker is preferably from 0.5 to 7 parts by weight per 100 parts by weight (A). When the polydiorganosiloxane (A) is hydroxyl endblocked, the amount of cross-linker is preferably from 5 to 15 parts by weight per 100 parts by weight of (A).

The composition of the present invention is prepared by mixing (A) and (B) under essentially anhydrous conditions. The method of mixing is not significant, but it is preferred to obtain a substantially homogeneous mixture for best results. The mixture when stored under anhydrous conditions is table over long periods of time, especially in those cases where the polydiorganosiloxane is acetoxy or alkoxy endblocked. In those cases where the polydiorganosiloxane is acetoxy or alkoxy endblocked, the composition is stable under anhydrous conditions even in the presence of a catalyst. The mixture wherein the polydiorganosiloxane is hydroxy endblocked can be either a one component or a two component system. One component systems using hydroxyl endblocked polydiorganosiloxanes are known in the art, for example, the compositions described by Ceyzeriat in U.S. Pat. No. 3,133,891 consisting essentially of a hydroxyl endblocked polydiorganosiloxane and an organotriacetoxysilane. Two component systems are those in which the mixing of the hydroxyl endblocked polydiorganosiloxane and the cross-linker immediately start to cure with or without a catalyst being present.

The compositions of the present invention cure upon exposure to moisture at room temperature to a silicone rubber. Although the compositions cure at room temperature without a catalyst, the length of time for a cure is sometimes not practical and it is therefore preferred to use of curing catalyst in the compositions of the present invention.

Any catalyst conventionally used in curing room temperature vulcanizable silicone rubber having alkoxy or acetoxy functionality can be used in the compositions of the present invention. For example, metal salts of carboxylic acids can be used as catalysts in the present invention as described in U.S. Pats. No. 3,077,465, No. 3,240,731, No. 3,133,891 and No. 3,161,614 which are hereby incorporated by reference in teaching catalyst. Examples of metal salts of carboxylic acids include dibutyltin diacetate, dibutyltindi-2-ethylhexoate, dibutyltindilaurate, lead naphthenate, cobalt naphthenate, zinc naphthenate, iron 2-ethylhexoate, and chromium octoate. Examples of other catalysts include oxalic acid, morpholine, triethanolamine, and toluene sulfamide as described in U.S. Pats. No. 3,240,731 and No. 3,133,891; titanium esters and amines and amine salts as described in U.S. Pat. No. 3,161,614. The amount of catalyst can vary broadly depending upon the type of catalyst used. Preferably the amount of catalyst ranges from 0.01 to 2 weight percent based on the weight of (A), and the best range is from 0.02 to 1 weight percent based on the weight of (A).

Other ingredients which are conventionally used in room temperature vulcanizable silicone rubber can be used in the compositions of the present invention. These ingredients are more fully described in the patents incorporated herein by reference and are here incorporated by reference to describe other ingredients. Such other ingredients include fillers such as reinforcing fillers such as fume silicas, silica aerogels and precipitated silicas both treated and untreated, non-reinforcing fillers such as diatomaceous earth, quartz, titania, zinc oxide and the like. The compositions of the present invention preferably contain a filler, particularly a reinforcing filler such as silica. The preferred amount of filler is from 5 to 40 parts by weight based on the weight of (A). Other additives which are conventionally used include pigments, sun-screen agents, oxidation inhibitors, inert organic solvents, flame retardants and the like.

The compositions of the present invention cure at room temperature when exposed to moisture to a silicone rubber which has improved adhesion to unprimed surfaces, particularly metal surfaces such as aluminum, stainless steel and titanium. The adhesive properties of the compositions are improved in that the peel strengths are increased, failure is more cohesive than prior art compositions and the adhesive strengths are more stable upon aging than prior art composition.

The compositions of the present invention can be used in the same manner as other room temperature vulcanizable silicone rubber but have the advantage that the adhesive properties are improved. The compositions of the present invention can be used as sealants, coatings, electrical insulation, encapsulants, caulking materials and the like.

The following examples are presented for illustrative purposes only and should not be construed as limiting the present invention which is properly delineated in the claims. All parts are parts by weight unless otherwise stated.

EXAMPLE 1

(A) An alkoxyacetoxysiloxane was prepared by heating two parts of a silane mixture having 50 weight percent ethyltriacetoxysilane and 50 weight percent methyltriacetoxysilane and one part of tetraethoxysilane under anhydrous conditions for 24 hours at 125° C. The resulting product was a mixture having 12.6 weight percent ethoxyacetoxysiloxane with the remaining materials being silanes. The ethoxyacetoxysiloxane had an acetoxy to ethoxy mole ratio of 1.4, a methyl-ethyl per silicon ratio of 0.65 and two and three silicon atoms per molecule.

(B) An alkoxyacetoxysiloxane was prepared by heating a mixture of silanes as described in (A) above for 8 hours at 185° C. The resulting product was a mixture having 15 weight percent of the same ethoxyacetoxysiloxane as prepared in (A) above.

ment on an Instron model TM tensile tester having a 180° peel mode with a jaw separation rate of 2 inches per minute. The peel strengths were recorded in pounds per linear inch (p.l.i.) and the amount of cohesive failure was observed.

The physical properties were determined by casting the room temperature vulcanizable silicone rubber in a 1/16 inch chase and then allowing it to cure at ambient conditions for seven days. The tensile strength and elongation at break were determined by ASTM-D-412 and the Die "B" tear strength was determined by ASTM-D-624-54. The results were as shown in Table I.

TABLE I

| Cross-linking agent | Parts cross-linking agent | Viscosity at 25° C. of hydroxyl endblocked polymer | Catalyst | Peel strength, p.l.i. | Cohesive failure, percent | Durometer, Shore A scale | Tensile strength at break, p.s.i. | Percent elongation at break | Die B tear strength, p.p.i. |
|---|---|---|---|---|---|---|---|---|---|
| (A) | 8.0 | 12,500 | Dibutyltindiacetate | 110 | 100 | | 730 | 648 | |
| (A) | 8.0 | 12,500 | Dibutyltindilaurate | 85 | 100 | | 848 | 550 | |
| (A) | 8.0 | 12,500 | Stannous octoate | 105 | 50 | | 685 | 665 | |
| (B) | 10.0 | 12,500 | Dibutyltindiacetate | 110 | 100 | | 558 | 457 | |
| (C) | 5.6 | 37,800 | ....do | 84 | 50 | 42 | 885 | 650 | 125 |
| (C) | 5.6 | 55,600 | ....do | 94 | 50 | 41 | 880 | 640 | 120 |
| (D) | 10.0 | 14,000 | ....do | 120 | 90 | 36 | 780 | 610 | 180 |
| (E) a | 10.0 | 12,500 | ....do | 40 | 30 | | 1,220 | 800 | |
| (F) a | 8.0 | 12,500 | ....do | 5 | 0 | 23 | 935 | 825 | 118 |
| (F) a | 6.5 | 149,000 | ....do | 3 | 0 | 25 | 1,300 | 850 | 91 |
| (F) a | 9.0 | 12,500 | ....do | 9 | 0 | | 1,018 | 765 | | a Presented for comparative purposes.

(C) An alkoxyacetoxysiloxane was prepared by heating a mixture of silanes as described in (A) above for 16 hours at 108° C. The resulting product was a mixture having 32.7 weight percent of the same ethoxyacetoxysiloxane as prepared in (A) above.

(D) An alkoxyacetoxysiloxane was prepared by heating a mixture of silanes as described in (A) above for 19 hours at 108° C. The resulting product was a mixture having 35 weight percent of the same ethoxyacetoxysiloxane as prepared in (A) above.

(E) a A mixture of 2 parts of a silane mixture having 50 weight percent ethyltriacetoxysilane and 50 weight percent methyltriacetoxysilane and 1 part of tetraethoxysilane.

(F) a A silane mixture having 50 weight percent ethyl triacetoxysilane and 50 weight percent methyltriacetoxysilane.

(G) The cross-linking agents defined above (A) through F. were used in the preparation of room temperature vulcanizable silicone rubbers. The cross-linking agent, 100 parts of a hydroxyl endblocked polydimethylsiloxane having a viscosity as defined in Table I, a silica filler having trimethylsiloxy treatment on the surface in an amount of 30 parts per 100 parts of hydroxyl endblocked polydimethylsiloxane, and a catalyst in an amount of 0.08 part per 100 parts of hydroxyl endblocked polydimethylsiloxane were thoroughly mixed in the absence of moisture and thereafter stored in moisture tight containers until used.

The adhesive properties of the room temperature vulcanizable silicone rubbers were determined on aluminum substrates in the following manner. Parallel 4-inch beads of the room temperature vulcanizable silicone rubber were applied on aluminum panels which were 4 inches by 6 inches with a 1/16 inch thickness. Aluminum strips which were 9 inches by 0.25 inch with a 16 mm. thickness were immediately pressed onto these beads. A chase surrounding the panel held the aluminum strips a constant 1/16 inch above the panel providing a uniform thickness for the room temperature vulcanizable silicone rubber. The panels and strips were solvent cleaned immediately prior to use. The assembly was then allowed to stand undisturbed at ambient conditions for seven day to allow the room temperature vulcanizable silicone rubber to cure. The peel strengths were then determined by measurea Presented for comparative purposes.

EXAMPLE 2

(A) an alkoxyacetoxysiloxane was prepared by placing one mole of $SiCl_4$ in a flask equipped with a condenser, addition funnel and stirrer and slowly adding over a 4 hour period one mole of ethanol. After the ethanol was completely added, the flask was heated to reflux for 10 minutes to drive off the HCl. The flask temperature was increased to 70° C. and three moles of acetic anhydride was slowly added. The flask temperature was maintained at 75° to 85° C. to allow continuous removal of acetyl chloride which was formed by the reaction. After all the acetic anhydride was added, the temperature was increased until the head temperature was 90° C. The contents of the flask were then treated with sodium acetate and dimethylglycol ether to remove any residual chloride. The contents were then heated to reflux for 10 minutes, cooled and then filtered. The flask contents were then vacuum stripped to 25° C. at 0.6 mm. of Hg. The residue was further stripped to a flask temperature of 74° C. at 0.14 mm. of Hg. This residue was a mixture containing 26.9 weight percent of an ethoxyacetoxysiloxane having an acetoxy to ethoxy mole ratio of 1.6 and two and three silicon atoms per molecule. The remaining part of the mixture was 1.6 weight percent monoacetoxytriethoxysilane, 34.9 weight percent diacetoxydiethoxysilane and 36.5 weight percent triacetoxymonoethoxysilane.

(B) The same procedure as described in (A) above was repeated and the product resulting after the first stripping was a mixture containing 28.6 weight percent of an ethoxyacetoxysiloxane having an acetoxy to ethoxy mole ratio of 1.00 and two and three silicon atoms per molecule. The remaining part of the mixture was 9.5 weight percent monoacetoxytriethoxysilane, 50.8 weight percent diacetoxydiethoxysilane and 11.1 weight percent triacetoxymonoethoxysilane.

(C) The same procedure as described in (A) above was repeated and the product resulting after the final stripping was a mixture containing 33.1 weight percent ethoxyacetoxysiloxane having an acetoxy to ethoxy mole ratio of 0.98 and two, three and four silicon atoms per molecule. The remaining part of the mixture was 11.6 weight percent monoacetoxytriethoxysilane, 43.7 weight percent diacetoxydiethoxysilane and 11.6 weight percent triacetoxymonoethoxysilane.

(D) a One mole of $SiCl_4$ was placed in a flask equipped with a stirrer, an addition funnel and a distillation column a Presented for comparative purposes.

with condenser and cold collection flask. To the SiCl₄, 6.5 moles of acetic anhydride was slowly added over a two hour period. The acetyl chloride was stripped off as it was formed. The flask was heated during the addition and thereafter until 70° C. was reached. The flask was then cooled to room temperature and the solidified tetraacetoxysilane was washed three times with a mixture of hexane and toluene followed by one wash with hexane. The tetraacetoxysilane was then mixed in to a mixture of hexane and toluene and thereafter cooled to −15° C. to −20° C. To the cooled mixture 5.5 moles of ethanol was slowly added over a four hour period while maintaining the temperature at −15° C. to −20° C. The flask contents were then stripped to 30° C. at 6 mm. of Hg. Thereafter, the flask contents were fractionated into nine fractions. The sixth fraction was taken as the product and was a mixture of 2 weight percent monoacetoxytriethoxysilane, 57.2 weight percent diacetoxydiethoxysilane, 38.4 weight percent triacetoxymonoethoxysilane and 2.4 weight percent tetraacetoxysilane.

(E)ᵃ A distillation fraction obtained from a residue as prepared by the method described in (A) above. The fraction was a mixture of 6.4 weight percent diacetoxydiethoxysilane, 79.4 weight percent triacetoxymonoethoxysilane and 14.2 weight percent tetraacetoxysilane.

(F)ᵃ A distillation fraction obtained from a residue as prepared by the method described in (A) above. The fraction was a mixture of 12.6 weight percent monoacetoxytriethoxysilane, 76.6 weight percent diacetoxydiethoxysilane and 10.8 weight percent triacetoxymonethoxysilane.

(G) The above cross-linking agents of (A) through (F) were used in the preparation of room temperature vulcanizable silicone rubbers. The room temperature vulcanizable silicone rubbers were prepared by thoroughly mixing 100 parts of a hydroxyl endblocked polydimethylsiloxane having a viscosity of 12,500 cs. at 25° C., 30 parts of a silica filler having trimethylsiloxy treatment on the surface, X parts of a cross-linking agent and Y parts of dibutyltindiacetate. The adhesive properties and the physical properties were determined as defined in Example 1 with the results as shown in Table II.

having 18.3 weight percent ethoxyacetoxysiloxane with the remaining materials being ethoxy-acetoxy silanes. The ethoxyacetoxysiloxane had an acetoxy to ethoxy mole ratio of 2.3, a methyl-ethyl per silicon ratio of 0.75 and two and three silicon atoms per molecule.

(B) An alkoxyacetoxysiloxane was prepared as described in (A) above except 4 parts of tetraethoxysilane were used instead of 3 parts. The resulting product was a mixture having 25.1 weight percent ethoxyacetoxysiloxane with the remaining materials being ethoxy-acetoxy silanes. The ethoxyacetoxysiloxane had an acetoxy to ethoxy mole ratio of 1.7, a methyl-ethyl per silicon ratio of 0.70 and two and three silicon atoms per molecule.

(C) An alkoxyacetoxysiloxane was prepared as described in (A) above except 5 parts of tetraethoxysilane were used instead of 3 parts. The resulting product was a mixture having 35 weight percent ethoxyacetoxysiloxane with the remaining materials being ethoxy-acetoxy silanes. The ethoxyacetoxysiloxane had an acetoxy to ethoxy mole ratio of 1.4, a methyl-ethyl per silicon ratio of 0.65 and two and three silicon atoms per molecule.

(D) An alkoxyacetoxysiloxane was prepared as described in (A) above except 6 parts of tetraethoxysilane were used instead of 3 parts. The resulting product was a mixture having 40.4 weight percent ethoxyacetoxysiloxane with the remaining materials being ethoxy-acetoxy silanes. The ethoxyacetoxysiloxane had an acetoxy to ethoxy mole ratio of 1.16, a methyl-ethyl per silicon ratio of 0.61 and two, three and four silicon atoms per molecule.

(E) An alkoxyacetoxysiloxane was prepared as described in (A) above except 7 parts of tetraethoxysilane was used instead of 3 parts. The resulting product was a mixture having 50 weight percent ethoxyacetoxysiloxane with the remaining materials being ethoxy-acetoxy silanes. The ethoxyacetoxysiloxane had an acetoxy to ethoxy mole ratio of 0.98, a methyl-ethyl per silicon ratio of 0.57 and two and three silicon atoms per molecule.

(F) Room temperature vulcanizable silicone rubbers were prepared by thoroughly mixing under anhydrous conditions 100 parts of a hydroxyl endblocked polydi-

TABLE II

| Cross-linking agent | X | Y | Peel strength, p.l.i. | Cohesive failure, percent | Durometer, Shore A scale | Tensile strength at break, p.s.i. | Elongation at break, percent | Tear strength die B p.p.i. |
|---|---|---|---|---|---|---|---|---|
| (A) ¹ | ² 6.2 | 0.13 | 128 | 100 | 32 | 655 | 425 | 91 |
| (A) ¹ | ² 6.2 | 0.00 | 112 | 100 | 27 | 510 | 490 | 119 |
| (B) | 1.4 | 0.08 | ³ >88 | 100 | | | | |
| (C) | 3.8 | 0.08 | ³ >80 | 100 | 35 | 715 | 470 | 95 |
| (D) ᵃ | 6.5 | 0.08 | 50 | 80 | 24 | 430 | 400 | 84 |
| (E) ¹ ² ᵃ | 6.0 | 0.08 | 44 | 60 | 18 | 295 | 370 | 39 |
| (E) ¹ ² ᵃ | 6.0 | 0.00 | 42 | 90 | 16 | 270 | 460 | 37 |
| (F) ¹ ² ᵃ | 6.0 | 0.08 | 68 | 100 | 16 | 430 | 530 | 66 |
| (F) ¹ ² ᵃ | 6.0 | 0.00 | 36 | 90 | 12 | 255 | 460 | 23 |
| (F) ¹ ² ᵃ | 1.0 | 0.08 | 7 | 0 | 24 | 730 | 460 | 103 |
| (F) ¹ ² ᵃ | 2.0 | 0.08 | 14 | 0 | 26 | 560 | 500 | 106 |

¹ 5 mol percent of the end groups of the hydroxyl endblocked polydimethyl siloxane are trimethylsiloxy groups.
² Contains 0.3 part tetraacetoxysilane.
³ The aluminum strip broke, therefore, peel strength of adhesive bond exceeds the tensile strength of the aluminum strip.
ᵃ Presented for comparative purposes.

EXAMPLE 3

(A) ᵃ An alkoxyacetoxysiloxane was prepared by heating 10 parts of a silane mixture having 50 weight percent ethyltriacetoxysilane and 50 weight percent methyltriacetoxysilane and 3 parts of tetraethoxysilane for 19 hours at 108° C. The resulting product was a mixture ᵃ Presented for comparative purposes.

methylsiloxane having a viscosity of 14,000 cs. at 25° C., 30 parts of silica filler as defined in Example 1, 0.08 part of dibutyltindiacetate, and 10.0 parts of cross-linking agent of (A) through (E) defined above. The room temperature vulcanizable silicone rubbers were tested for adhesive properties and physical properties as defined in Example 1. The results were as shown in Table III.

TABLE III

| Cross-linking agent | Peel strength, p.l.i. | Cohesive failure, percent | Durometer, Shore A scale | Tensile strength at break, p.s.i. | Elongation at break, percent | Tear strength die B, p.p.i. |
|---|---|---|---|---|---|---|
| (A)ᵃ | 4 | 0 | 42 | 720 | 490 | 159 |
| (B) | 100 | 40 | 35 | 835 | 640 | 200 |
| (C) | 120 | 90 | 36 | 780 | 610 | 180 |
| (D) | 130 | 100 | 34 | 715 | 600 | 185 |
| (E) | 130 | 100 | 38 | 720 | 600 | 210 |

ᵃ Presented for comparative purposes.

EXAMPLE 4

(A) An alkoxyacetoxysiloxane was prepared by heating a silane mixture of 2 parts of methyltriacetoxysilane and 1 part of tetraethoxysilane for 24 hours at 108° C. The resulting product was a mixture of 30 weight percent ethoxyacetoxyqsiloxane with the remaining material being ethoxy-acetoxy silanes. The ethoxyacetoxysiloxane had an acetoxy to ethoxy mole ratio of 1.4, a methyl per silicon ratio of 0.65 and two and three silicon atoms per molecule.

(B) An alkoxyacetoxysiloxane was prepared by heating a silane mixture of 5 parts of methyltriacetoxysilane and 3 parts of tetraethoxysilane in the presence of one weight percent Filtrol acid clay catalyst for 2 hours at 110° C. The resulting product was a mixture having 24 weight percent ethoxyacetoxysiloxane with the remaining materials being ethoxy-acetoxy silanes. The ethoxyactoxysiloxane had an acetoxy to ethoxy mole ratio of 1.15, a methyl per silicon ratio of 0.61 and two silicon atoms per molecule.

(C) An alkoxyacetoxysiloxane was prepared by heating a silane mixture of 5 parts of phenyltriacetoxysilane and 3 parts of tetraethoxysilane for 24 hours at 108° C. The resulting product was a mixture having 20 weight percent ethoxyacetoxysiloxane with the remaining material being ethoxy-acetoxy silanes. The ethoxyacetoxysiloxane had an acetoxy to ethoxy mole ratio of 0.9, a phenyl per silicon ratio of 0.55 and two silicon atoms per molecule.

(D) [a] An alkoxyacetoxysiloxane mixture was prepared for comparative purposes by the procedure described in Example 2(A) in which one mole of methyltrichlorosilane replaced the $SiCl_4$ and 2 moles of acetic anhydride replaced three moles of acetic anhydride. The recovered product was a mixture having 7.3 weight percent methyldiethoxyacetoxysilane, 62.7 weight percent methylethoxydiacetoxysilane, 28.0 weight percent methyltriacetoxysilane, and 2.0 weight percent of ethoxyacetoxysiloxane having a methyl to silicon ratio of 1.00 and two silicon atoms per molecule.

(E) [a] Methyltriacetoxysilane.

(F) [a] Ethyltriacetoxysilane.

(G) [a] A mixture of 50 weight percent methyltriacetoxysilane and 50 weight percent ethyltriacetoxysilane.

(H) [a] Vinyltriacetoxysilane.

(I) [a] Phenyltriacetoxysilane.

(J) [a]

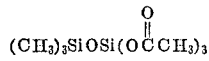

(K) [a]

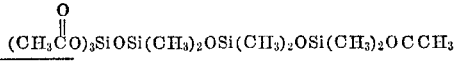

[a] Presented for comparative purposes.

(L) [a]

(M) Room temperature vulcanizable silicone rubbers were prepared by thoroughly mixing under anhydrous conditions 100 parts of hydroxyl endblocked polydimethylsiloxane having a viscosity of 12,500 cs. at 25° C., 30 parts of a silica filler as defined in Example 1, 0.08 part of dibutyltindiacetate and X parts of crosslinking agent. The adhesive properties and the physical properties were determined as shown in Example 1. The results were as shown in Table IV.

TABLE IV

| Cross-linking agent | X | Peel strength, p.l.i. | Cohesive failure, percent | Durometer Shore A scale | Tensile strength at break, p.s.i. | Elongation at break, percent | Tear strength Die B, p.p.i. |
|---|---|---|---|---|---|---|---|
| (A) | 8.0 | 115 | 75 | | 695 | 505 | |
| (B)[1] | 10.0 | 70 | 20 | 30 | 700 | 475 | 137 |
| (C) | [2] 2.0 | 125 | 65 | | 723 | 587 | |
| (D)[3] [a] | 6.0 | 4 | 0 | | | | |
| (E)[a] | 10.0 | 2 | 0 | | 905 | 630 | |
| (F)[a] | 10.0 | 15 | 0 | | 925 | 800 | |
| (G)[a] | 9.0 | 9 | 0 | | 1,018 | 765 | |
| (H)[a] | 10.0 | 10 | 40 | | 910 | 640 | |
| (I)[a] | 10.0 | 30 | 10 | | 1,100 | 920 | |
| (J)[a] | 8.0 | 8 | 0 | | 650 | 1,000 | |
| (K)[a] | 8.0 | 3 | 0 | | 750 | 745 | |
| (L)[a] | 8.0 | 10 | 0 | | 435 | 310 | |

[1] Hydroxyl endblocked polydimethylsiloxane has a viscosity of 14,000 cs. at 25° C.
[2] Also contains 6.0 parts of a mixture having 50 percent methyltriacetoxysilane and 50 weight percent ethyltriacetoxysilane.
[3] Has 20 parts silica filler instead of 30 parts.
[a] Presented for comparative purposes.

EXAMPLE 5

(A) An alkoxyacetoxysiloxane was prepared by heating a silane mixture of 5 parts of a mixture of 50 weight percent ethyltriacetoxysilane and 50 weight percent of methyltriacetoxysilane and 3 parts of tetraethoxysilane for 38 hours at 120° C. under a nitrogen atmosphere. The resulting product was a mixture having 10 weight percent ethoxyacetoxysiloxane with the remaining material being ethoxy-acetoxy silanes. The ethoxyacetoxysiloxane has an acetoxy to ethoxy mole ratio of 1.14, a methyl-ethyl per silicon ratio of 0.60 and two silicon atoms per molecule.

(B) An alkoxyacetoxysiloxane was prepared by heating the silane mixture described in A above for 20 hours at 108° C. The resulting product was a mixture having 10 weight percent ethoxyacetoxysiloxane with the remaining material being ethoxy-acetoxy silanes. The ethoxyacetoxysiloxane had an acetoxy to ethoxy mole ratio of 1.6, a methyl-ethyl per silicon ratio of 0.61 and two silicon atoms per molecule.

(C) [a] A mixture of 4 parts of a mixture of 50 weight percent ethyltriacetoxysilane and 50 weight percent methyltriacetoxysilane and 1 part of tetraethoxysilane was heated for 16 hours at 108° C. The resulting product was a mixture having 11.7 weight percent ethoxyacetoxysiloxane with the remaining material being ethoxy-acetoxy silanes. The ethoxyacetoxysiloxane had an acetoxy to ethoxy mole ratio of 3,0, a methyl-ethyl per silicon ratio of 0.80 and two silicon atoms per molecule.

(D) An ethoxyacetoxysiloxane was prepared as described in (A) above except the mixture was heated for 54 hours. The resulting product was a mixture having 12.9 weight percent ethoxyacetoxysiloxane with the remaining material being ethoxy-acetoxy silanes. The ethoxyacetoxysiloxane was the same as described in (A) above except the siloxane species contained two and three silicon atoms per molecule.

(E) An ethoxyacetoxysiloxane was prepared as described in (A) above except the mixture was heated for 61 hours. The resulting product was a mixture having 16.9 weight percent ethoxyacetoxysiloxane as described

[a] Presented for comparative purposes.

in (D) above with the remaining material being ethoxyacetoxy silanes.

(F) An alkoxyacetoxysiloxane was prepared by heating a silane mixture of 3 parts of tetraacetoxysilane and 1 part of tetraethoxysilane for 52 hours at 108° C. The resulting product was a mixture having 18.5 weight percent ethoxyacetoxysiloxane with the remaining material being ethoxy-acetoxy silanes. The ethoxyacetoxysiloxane had an acetoxy to ethoxy mole ratio of 1.0 and two and three silicon atoms per molecule.

(G) An alkoxyacetoxysiloxane was prepared as described in (A) above except the mixture was heated 89 hours. To 98.3 parts of the resulting mixture, 1.7 parts of water was added. The resulting product was a mixture having 26.0 weight percent ethoxyacetoxysiloxane with the remaining material being ethoxy-acetoxy silanes. The ethoxyacetoxysiloxane had an acetoxy to ethoxy mole ratio of 0.85, a methyl-ethyl per silicon ratio of 0.60 and two, three, four and five silicon atoms per molecule.

(H) Room temperature vulcanizable silicone rubbers were prepared by thoroughly mixing under anhydrous conditions 100 parts of a hydroxyl endblocked polydimethylsiloxane having a viscosity of 12,500 cs. at 25° C., 30 parts by weight of a silica filler as described in Example 1, 0.08 part of dibutyltindiacetate and X parts of cross-linking agent. The adhesive properties and the physical properties were determined as described in Example 1 and the results were as shown in Table V.

Example 1. The cured silicone rubber had a peel strength of 170 p.l.i. with 100% cohesive failure, a durometer on the Shore A scale of 38, a tensile strength at break of 820 p.s.i., an elongation at break of 510% and a tear strength, die "B" of 157 p.p.i. The peel strength was the same for both aluminum and stainless steel.

EXAMPLE 8

A room temperature vulcanizable silicone rubber was prepared by thoroughly mixing 100 parts of a hydroxyl endblocked polydimethylsiloxane having a viscosity of 12,500 cs. at 25° C., 20 parts of silica filler as described in Example 1, 5 parts of tetra-n-propoxysilane and 0.5 part of dibutyltindiacetate. Another room temperature vulcanizable silicone rubber was prepared identical to one described above except 1.0 part of the ethoxyacetoxysiloxane mixture of Example 3(E) was also added. The physical properties and adhesive properties were determined as described in Example 1. The cured silicone rubber without the ethoxyacetoxysiloxane mixture had a peel strength of 8 p.l.i. with 60 percent cohesive failure and the cured silicone rubber with the ethoxyacetoxysiloxane mixture had a peel strength of 15 p.l.i. with 80 percent cohesive failure.

EXAMPLE 9

A room temperature vulcanizable silicone rubber was prepared by thoroughly mixing under anhydrous condi-

TABLE V

| Cross-linking agent | X | Peel strength, p.l.i. | Cohesive failure, percent | Durometer Shore A scale | Tensile strength at break, p.s.i. | Elongation at break, percent | Tear strength die B, p.p.i. |
|---|---|---|---|---|---|---|---|
| (A) | 8.0 | 120 | 80 | | 638 | 503 | |
| (B) | 10.0 | 80 | 50 | 37 | 730 | 550 | 174 |
| (C)a | 7.0 | 35 | 35 | 22 | 765 | 700 | 125 |
| (D) | 8.0 | 130 | 90 | | 700 | 563 | |
| (E) | 8.0 | 120 | 80 | | 570 | 443 | |
| (F) | 10.0 | 115 | 100 | | 790 | 500 | |
| (G) | 8.0 | 125 | 75 | | 612 | 560 | |

1 Hydroxyl endblocked polydimethylsiloxane had a viscosity of 14,000 cs. at 25° C.
a Presented for comparative purposes.

EXAMPLE 6

A room temperature vulcanizable silicone rubber was prepared by thoroughly mixing under anhydrous conditions, 100 parts of a hydroxyl endblocked polydimethylsiloxane having a viscosity of 12,500 cs. at 25° C., 20 parts of silica filler as described in Example 1, 4 parts of untreated silica filler, 8.0 parts of a mixture of 50 weight percent ethyltriacetoxysilane and 50 weight percent methyltriacetoxysilane, 0.08 part of dibutyltin diacetate and 2.0 parts of the ethoxyacetoxysiloxane mixture of Example 3(E). The adhesive properties and physical properties were determined as described in Example 1. The cured silicone rubber had a peel strength of 80 p.l.i. with 100 percent cohesive failure, a durometer on the Shore A scale of 41, a tensile strength at break of 525 p.s.i., an elongation at break of 450 and a tear strength, die "B," of 85 p.s.i.

EXAMPLE 7

A room temperature vulcanizable silicone rubber was prepared by thoroughly mixing under anhydrous conditions 100 parts of a hydroxyl endblocked polydimethylsiloxane having a viscosity of 14,000 cs. at 25° C., 28 parts of silica filler as described in Example 1, 7.5 parts of the ethyltriacetoxysilane and methyltriacetoxysilane mixture described in Example 6, 3.0 parts of iron oxide, 2.0 parts of a hydroxyl endblocked polyphenylmethylsiloxane fluid, 0.02 part of dibutyltin diacetate, and 5.0 parts of an ethoxyacetoxylsiloxane mixture having 33.4 weight percent siloxane, an acetoxy to ethoxy mole rtaio of 1.16, a methyl-ethyl per silicon ratio of 0.61 and two, three and four silicon atoms per molecule. The adhesive properties and physical properties were determined as described in tions 100 parts of a dimethoxymethylsiloxy end-blocked polydimethylsiloxane having a viscosity of 15,000 cs. at 25° C., 30 parts of silica filler as described in Example 1, 4 parts of methyltrimethoxysilane and 0.6 part of tetrabutyltitanate. Another room temperature vulcanizable silicone rubber was prepared by thoroughly mixing under anhydrous conditions, 100 parts of the dimethoxymethylsiloxy endblocked polymer described above, 30 parts of a silica filler as described in Example 1, 4 parts of methyltrimethoxysilane, 0.12 part of dibutyltindiacetate, and 1.5 parts of an ethoxyacetoxysiloxane mixture having 39.6 weight percent siloxane which had an acetoxy to ethoxy mole ratio of 1.16, a methyl-ethyl per silicon ratio of 0.61 and two, three and four silicon atoms per molecule. The adhesive properties and the physical properties were determined as described in Example 1. The first cured silicone rubber had a peel strength of 70 p.l.i. with 90% cohesive failure, a durometer on the Shore A scale of 25, a tensile strength at break of 540 p.s.i., an elongation at break of 850 percent and a tear strength, die "B," of 15 p.p.i. The second cured silicone rubber with the ethoxyacetoxysiloxane had a peel strength greater than 80 p.l.i. (the aluminum strip broke) with 100 percent cohesive failure, a durometer on the Shore A scale of 38, a tensile strength at break of 810 p.s.i., an elongation at break of 690 percent and a tear strength, die "B" of 228 p.p.i.

EXAMPLE 10

When the following alkoxyacetoxysiloxanes were prepared as described in Example 4(B) and were used to make room temperature vulcanizable silicone rubbers as described in Example 4(M), improved adhesion was observed to aluminum and steel.

15

(A) A mixture having 20 weight percent (methoxyethoxy)acetoxysiloxane with the remaining material being methoxyethoxyacetoxy silanes. The (methoxyethoxy)acetoxysiloxane had an acetoxy to methoxyethoxy mole ratio of 1.75, a methyl-ethyl per silicon ratio of 0.71 and two silicon atoms per molecule.

(B) A mixture having 10 weight percent isopropoxyacetoxysiloxane with the remaining material being isopropoxy-acetoxy silanes. The isopropoxyacetoxysiloxane had an acetoxy to isopropoxy mole ratio of 1.16, a methyl-ethyl per silicon ratio of 0.61 and two silicon atoms per molecule.

(C) A mixture having 10 weight percent ethoxy acetoxysiloxane with the remaining material being ethoxyacetoxy silanes. The ethoxyacetoxysiloxane had an acetoxy to ethoxy mole ratio of 1.16, a methyl-ethyl per silicon ratio of 1.00 and two and three silicon atoms per molecule.

EXAMPLE 11

When the following polydiorganosiloxanes replace the polydimethylsiloxane of Example 3(F), equivalent results are obtained.

(A) A hydroxyl endblocked polydiethylsiloxane having a viscosity of 1,500 cs. at 25° C.

(B) A hydroxyl endblocked polydimethylsiloxane having a viscosity of 200,000 cs. at 25° C.

(C) A hydroxyl endblocked polydiorganosiloxane having 98 mol percent dimethylsiloxane units and 2 mole percent methylvinylsiloxane units and having a viscosity of 40,000 cs. at 25° C.

(D) A hydroxyl endblocked polyphenylmethylsiloxane having a viscosity of 1,000 cs. at 25° C.

(E) A hydroxyl endblocked polydiorganosiloxane having 75 mol percent dimethylsiloxane units, 5 mol percent diphenylsiloxane units, 15 mol percent phenylmethylsiloxane units and 5 mol percent octadecylmethylsiloxane units and having a viscosity of 15,000 cs. at 25° C.

EXAMPLE 12

A room temperature vulcanizable silicone rubber was prepared by thoroughly mixing under anhydrous conditions 100 parts of a hydroxyl endblocked poly-3,3,3-trifluoropropylmethylsiloxane having a viscosity of 40,000 cs. at 25° C., 10 parts of a silica filler having trimethylsiloxy treatment, 10 parts of titanium dioxide, 5 parts of vinyltriacetoxysilane and 5 parts of the ethoxyacetoxysiloxane product of Example 3(D) and 0.08 part of dibutyltindiacetate. The room temperature vulcanizable silicone rubber tested for adhesion as described in Example 1 had a peel strength greater than 20 times the peel strength of an identical room temperature vulcanizable silicone rubber where the 5 parts of ethoxyacetoxysiloxane were replaced with 5 parts of vinyltriacetoxysilane. The substrate was aluminum. The adhesion for the room temperature vulcanizable silicone rubber containing the ethoxyacetoxysiloxane failed 100% cohesively whereas the failure for the room temperature vulcanizable silicone rubber containing only vinyltriacetoxysilane was 100% adhesive.

That which is claimed is:

1. A composition which is stable in the absence of moisture but cures to a silicone rubber when exposed to moisture at room temperature comprising (A) 100 parts by weight of a polydiorganosiloxane having a unit formula $R_2SiO$ bonded together by silicon-oxygen-silicon bonds and having a viscosity of from 1,000 to 200,000 cs. at 25° C., said polydiorganosiloxane being terminated by radicals selected from the group consisting of hydroxyl radicals and radicals of the formula $R(YO)_2SiO_{0.5}$ where R is a monovalent radical of from 1 to 18 inclusive carbon atoms selected from the group consisting of hydrocarbon radicals and halogenated hydrocarbon radicals and YO— is acetoxy or alkoxy, and

16

(B) from 0.5 to 15 parts by weight of a cross-linking agent selected from the group consisting of (a) a mixture consisting essentially of at least 10 weight percent of an alkoxyacetoxysiloxane of the average unit formula

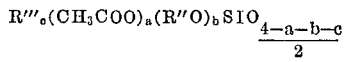

in which the ratio of $a:b$ is 0.85 to 1.75 inclusive, the sum of $a+b+c$ is from 2.4 to 3 inclusive, $c$ has an average value from 0 to 1 inclusive, $R'''$ is the same as R, $R''$ is a monovalent radical of from 1 to 6 inclusive carbon atoms selected from the group consisting of alkyl, alkoxyalkyl and phenyl and the remaining portion of the mixture consisting essentially of silanes, providing a silane mixture, of the formula $R'''_dSi(OOCCH_3)_e(OR'')_f$ in which $R'''$ and $R''$ are defined above, for each silane specie $d$ is an integer of 0 to 1 inclusive, $e$ is an integer of 1 to 3 inclusive, $f$ is an integer of 1 to 3 inclusive, the sum of $d+e+f$ is 4, in the total remaining portion of the mixture, the silane mixture is such that in an average formula of silane the ratio of $e:f$ is 0.85 to 1.75 inclusive and $d$ has an average value from 0 to 1 inclusive, and (b) a mixture of (a) with a silane of the formula $R_gSi(OY)_{4-g}$ in which R and OY are defined above and $g$ is an integer of 0 to 1 inclusive and partial hydrolyzates of $R_gSi(OY)_{4-g}$ wherein (a) is present in an amount sufficient to provide at least 0.5 part by weight in the total mixture of (A) and (B).

2. The composition in accordance with claim 1 in which a curing catalyst for room temperature vulcanizable silicone rubber having alkoxy or acetoxy functionality is also present.

3. The composition in accordance with claim 1 in which a filler is present.

4. The composition in accordance with claim 1 in which the polydiorganosiloxane is a hydroxyl endblocked polydimethylsiloxane.

5. The composition in accordance with claim 1 in which the ratio of $a:b$ is 1.0 to 1.50 inclusive, $c$ has a value from 0.5 to 0.8 inclusive and the sum of $a+b+c$ is from 2.6 to 3 inclusive.

6. The composition in accordance with claim 5 in which a curing catalyst for room temperature vulcanizable silicone rubber having alkoxy or acetoxy functionality is also present.

7. The composition in accordance with claim 6 in which a filler is present.

8. The composition in accordance with claim 7 in which the polydiorganosiloxane is a hydroxyl endblocked polydimethylsiloxane.

9. The composition in accordance with claim 1 in which the polydiorganosiloxane has a viscosity of from 1,500 to 40,000 cs. at 25° C. inclusive.

10. The composition in accordance with claim 8 in which the hydroxyl endblocked polydimethylsiloxane has a viscosity of from 1,500 to 40,000 cs. at 25° C. inclusive.

11. The composition in accordance with claim 10 in which $R''$ is an ethyl radical.

12. The composition in accordance with claim 5 in which at least 40 mol percent of the $R'''$ are ethyl radicals and the remaining $R'''$ are methyl radicals.

13. The composition in accordance with claim 10 in which at least 40 mol percent of the $R'''$ are ethyl radicals and the remaining $R'''$ are methyl radicals and $R''$ is an ethyl radical.

14. The composition in accordance with claim 1 in which the alkoxyacetoxysiloxane is at least 25 weight percent of mixture (a).

15. The composition in accordance with claim 5 in which the alkoxyacetoxysiloxane is at least 25 weight percent of mixture (a).

16. The composition in accordance with claim 15 in which R″ is an ethyl radical.

17. The composition in accordance with claim 10 in which the alkoxyacetoxysiloxane is at least 25 weight percent of mixture (a).

18. The composition in accordance with claim 13 in which the alkoxyacetoxysiloxane is at least 25 weight percent of mixture (a).

19. The composition in accordance with claim 1 in which (B) is a mixture (b).

20. The composition in accordance with claim 18 in which (B) is a mixture (b) and R″ is an ethyl radical.

21. The composition in accordance with claim 19 in which $R_gSi(OY)_{4-g}$ is a mixture of methyltriacetoxysilane and ethyltriacetoxysilane.

22. The composition in accordance with claim 20 in which $R_gSi(OY)_{4-g}$ is a mixture of methyltriacetoxysilane and ethyltriacetoxysilane.

23. The composition in accordance with claim 1 in which (B) is present in an amount of from 0.5 to 7 parts by weight.

24. The composition in accordance with claim 1 in which (B) is present in an amount of from 5 to 15 parts by weight.

25. The composition in accordance with claim 10 in which (B) is present in an amount of from 5 to 15 parts by weight.

26. The composition in accordance with claim 18 in which (B) is present in an amount of from 5 to 15 parts by weight.

27. The composition in accordance with claim 22 in which (B) is present in an amount of from 5 to 15 parts by weight.

28. A cross-linking agent consisting essentially of a mixture of at least 10 weight percent of an alkoxyacetoxysiloxane of the average unit formula

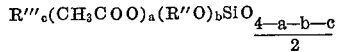

in which the ratio of $a:b$ is from 0.85 to 1.75 inclusive, $c$ has an average value from 0 to 1 inclusive, the sum of $a+b+c$ is from 2.4 to 3 inclusive, R‴ is a monovalent radical of from 1 to 18 inclusive carbon atoms selected from the group consisting of hydrocarbon radicals and halogenated hydrocarbon radicals, R″ is a monovalent radical of from 1 to 6 inclusive carbon atoms selected from the group consisting of alkyl, alkoxyalkyl and phenyl and the remaining portion of the mixture consisting essentially of silanes, providing a silane mixture, of the formula $R'''_dSi(OOCCH_3)_e(OR'')_f$ in which R‴ and R″ are defined above, for each silane specie $d$ is an integer of 0 to 1 inclusive, $e$ is an integer of 1 to 3 inclusive, $f$ is an integer of 1 to 3 inclusive, the sum of $d+e+f$ is 4, in the total remaining portion of the mixture, the silane mixture is such that in an average formula of silane the ratio of $e:f$ is 0.85 to 1.75 inclusive and $d$ has an average value from 0 to 1 inclusive.

29. The cross-linking agent in accordance with claim 28 in which the ratio of $a:b$ is from 1.0 to 1.50 inclusive, $c$ has an average value from 0.5 to 0.8 inclusive and the sum of $a+b+c$ is from 2.6 to 3 inclusive.

30. The cross-linking agent in accordance with claim 29 in which at least 40 mol percent of the R‴ are ethyl radicals and the remaining R‴ are methyl radicals.

31. The cross-linking agent in accordance with claim 28 in which the mixture is at least 25 weight percent alkoxyacetoxysiloxane.

32. The cross-linking agent in accordance with claim 30 in which the mixture is at least 25 weight percent alkoxyacetoxysiloxane.

33. The cross-linking agent in accordance with claim 28 in which R″ is an ethyl radical.

34. The cross-linking agent in accordance with claim 29 in which R″ is an ethyl radical.

35. The cross-linking agent in accordance with claim 32 in which R″ is an ethyl radical.

References Cited
UNITED STATES PATENTS 3,440,207    4/1969    Nitzsche et al. _____ 260—37

DONALD E. CZAJA, Primary Examiner

M. I. MARQUIS, Assistant Examiner

U.S. Cl. X.R.

106—287 SB; 117—135.1; 260—18 S; 37 SB, 46.5 R, 46.5 G, 448.2 B, 448.8 R